United States Patent [19]

van der Lende et al.

[11] 4,132,279
[45] Jan. 2, 1979

[54] AUTOMOTIVE TRACTOR UNIT, MORE PARTICULARLY FOR RIDING AND WORKING ON VERTICAL WALLS, CEILINGS AND SUCHLIKE

[76] Inventors: Leendert J. van der Lende, Jan Van Avenne straat 530; Michel L. Zwaanswijk, Zijdewindestraat 47 A, both of Rotterdam, Netherlands

[21] Appl. No.: 818,678

[22] Filed: Jul. 25, 1977

[30] Foreign Application Priority Data

Aug. 18, 1976 [BE] Belgium .................................. 55250

[51] Int. Cl.² ............................................. B62D 55/10
[52] U.S. Cl. .................................... 180/9.5; 114/222; 180/1 VS; 305/20; 305/35 EB
[58] Field of Search ................ 305/20, 21, 35 EB, 51, 305/35 R; 114/222; 180/1 VS, 9.5

[56] References Cited

U.S. PATENT DOCUMENTS

| | | | |
|---|---|---|---|
| 2,458,755 | 1/1949 | Waller | 305/35 R X |
| 3,687,226 | 8/1972 | Coyne | 180/9.5 |
| 3,777,834 | 12/1973 | Hiraoka et al. | 114/222 X |
| 3,960,229 | 6/1976 | Shio | 114/222 X |

FOREIGN PATENT DOCUMENTS 463634  8/1928  Fed. Rep. of Germany ............. 305/20

Primary Examiner—Robert B. Reeves
Assistant Examiner—John P. Shannon
Attorney, Agent, or Firm—Bacon & Thomas

[57] ABSTRACT

The invention pertains to an automotive tractor unit, more particularly for riding and working on vertical walls and ceilings, of the type which consists mainly of a frame; of belt shaped progression elements or tracks which are appropriately driven and are provided with adhesion devices such as suction discs or magnets as well as with elements for attaching appropriate accessories or tools such as a spraying piston or suchlike to the tractor. The belts or tracks are fitted so as to hinge with respect to the frame and around shafts which extend in the longitudinal sense of the tractor.

1 Claim, 3 Drawing Figures

AUTOMOTIVE TRACTOR UNIT, MORE PARTICULARLY FOR RIDING AND WORKING ON VERTICAL WALLS, CEILINGS AND SUCHLIKE

This invention pertains to a device which is controlled from floor level and by means of which it is possible to traverse vertical walls and even ceilings so as to perform work with appropriate accessories, such as brushes, spraying devices and suchlike, which can be attached for this purpose to said device.

When such a device is being used on a metal wall, such as for instance the hull of a ship, a storage tank or suchlike, the belts or tracks of the tractor unit are provided with magnets or sucker discs, whereas when this device is used on non-metal walls, aforesaid belts or tracks are fitted with sucking discs or suckers.

This known automotive tractor unit does however have the disadvantage of not being able to follow all the unevennesses of the surface which has to be treated, which in the case of ship hulls or storage tanks may consist of rivets, edges of overlapping panels, etc., whereby the device may tilt and get locally detached from the surface over which it is moving, so that effective adhesion of the device against the wall under consideration may be endangered.

The subject of the present invention therefore is an automotive tractor unit which is capable of following all unevennesses of the surface which has to be treated, so that the adhesion elements provided — magnets, suckings discs or suchlike, which will be called surface gripping devices — remain at all times simultaneously in contact with aforesaid surface so that the device always remains effectively attached to the latter.

For this purpose the device is characterized by at least three main characteristics, namely:

the belts or tracks are attached to the tractor frame so as to be able to pivot around a shaft which extends in the longitudinal sense of the tractor;

the belts or tracks are made of some supple and flexible material;

the magnets or suckers are provided in two or more rows on the belts or tracks.

For the purpose of clarifying the characteristics of the present invention, a preferred form of embodiment of such a tractor unit shall be described hereinafter, merely as an example and without the slightest intent of limitation, with reference to the appended drawings in which.

Figure 1:
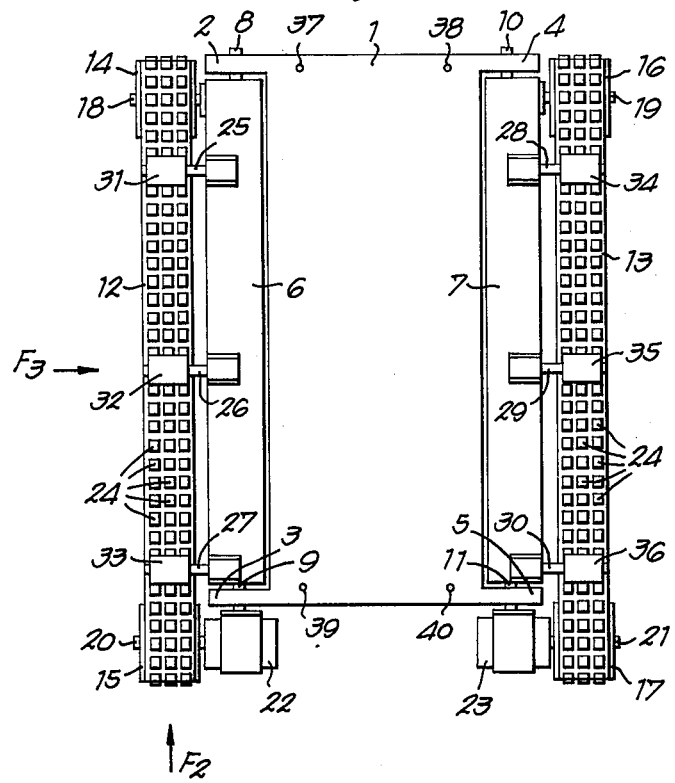
FIG. 1 shows a schematic top view of a tractor unit according to the invention.
Figure 2:
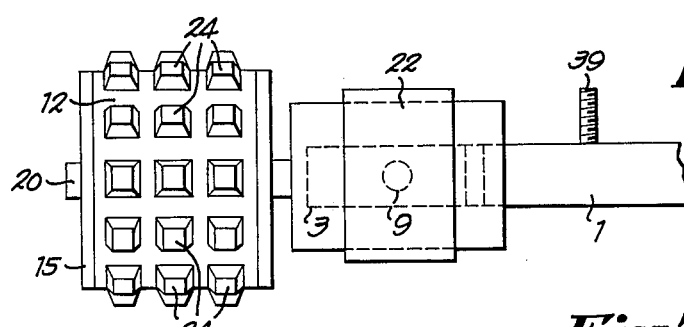
FIG. 2 shows, to a larger scale, a partial view as seen along arrow F2 in FIG. 1.

In this form of embodiment, the tractor unit according to the invention mainly consists of an actual frame 1, provided at each end with a protrusion, respectively 2-3 and 4-5, whereby there are provided in the spaces existing between the frame and protrusions 2-3, on the one hand, and 4-5, on the other hand, supports, respectively 6 and 7, which are attached at each end by means of appropriate pivots, respectively 8-9 and 10-11, to frame 1 with respect to which they are free to rotate.

Besides each support 6 and 7, a flexible belt is fitted, respectively 12 and 13, whereby this belt is guided over running wheels, respectively 14-15 and 16-17, whereby running wheels 14 and 16 are each fixed upon a shaft, respectively 18 and 19, which is free to rotate in bearings on the support concerned, respectively 6 and 7, whereas wheels 15 and 17 are fixed upon shafts, respectively 20 and 21, which consist of the output shafts of motors, preferably electric motors, respectively 22 and 23, whereby these motors are fixed in some appropriate manner to the respective pivots 9 and 11.

In the example shown, the flexible belts 12 and 13 are provided with three rows of magnetic blocklets 24.

Figure 3:
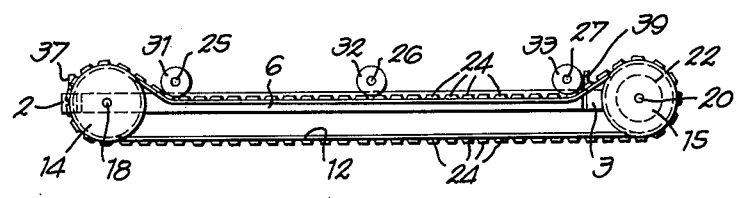
FIG. 3 is a view as seen along arrow F3 in FIG. 1.

On each support 6 and 7, shafts are further provided, respectively 25, 26 and 27, on the one hand, and 28, 29 and 30, on the other hand, whereby freely rotating tensioning rollers, respectively 31-32-33 and 34-35-36, are fitted on these shafts, so that, as shown in FIG. 3, these rollers will press down the upper of flexible belts 12 and 13, for the purpose of bringing this upper stretch as close as possible to the lower stretch of flexible belts 12 and 13, or in other words so as to bring the center of gravity of the device as close as possible to the surface to be treated, which favors the adhesion by reducing the tilting moment.

On frame 1, supports are further provided, respectively 37-38 and 39-40, consisting for instance of threaded studs fixed vertically upon frame 1 so as to permit the attachment on said frame of accessories such as working tools.

It is obvious that by the use of such a device all unevennesses of the surface will remain without influence upon the good adhesion of the tractor unit, considering on the one hand, that these unevennesses can be absorbed since belts 12 and 13 can rotate with respect to each other around pivots 8-9 and 10-11, whereas on the other hand, the unevennesses will be absorbed by the local distortion of flexible belts 12 and 13, which is made possible due to the fact that the small magnets 24 consist of small blocklets located adjacent to each other.

It therefore is obvious that an automotive tractor unit is obtained in this manner, by means of which it is possible to treat all possible surfaces with the greatest reliability, even those surfaces which are very uneven.

The reliability of the device is further increased by the lowering of the center of gravity.

It should finally also be noted that for clearness' sake the distance between upper and lower stretches of a belt has been drawn relatively large in FIG. 3, but that this distance can be maintained very small.

The present invention is by no means limited to the form of embodiment described as an example and illustrated in the appended drawings, as such a tractor unit may be built in all sorts of shapes and to any dimensions without going beyond the scope of the present invention.

What we claim is:

1. An automotive tractor unit for traversing vertical walls and ceilings, including a frame and two separate driving assemblies mounted on distinct sides of said frame, each of said driving assemblies including a support pivotally mounted on an axle parallel to the longitudinal axis of said frame, a set of wheels including at least two wheels mounted on each said support and having axles substantially perpendicular to said longitudinal axis, said driving assemblies each including a motor driving one of said two wheels, a flexible endless belt arranged on said two wheels, said belt carrying a plurality of rows of surface gripping devices, a series of rollers mounted on each said support above an upper stretch of said belt, so as to exert a pressure on said upper stretch and so as to push said upper stretch in the direction of the lower stretch of said belt.

* * * * *